US 6,683,981 B1

(12) United States Patent
Matama (10) Patent No.: US 6,683,981 B1
(45) Date of Patent: Jan. 27, 2004

(54) IMAGE PROCESSING METHOD (75) Inventor: Toru Matama, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/376,300

(22) Filed: Aug. 18, 1999

(30) Foreign Application Priority Data

Aug. 19, 1998 (JP) ............................................. 10-232734

(51) Int. Cl.⁷ .............................. G06K 9/00; H04N 1/46; G03F 3/08
(52) U.S. Cl. ....................... 382/167; 382/169; 358/1.9; 358/504; 358/518
(58) Field of Search ....................... 358/1.9, 504, 518, 358/534, 3.01, 3.1, 3.23; 382/167, 169

(56) References Cited

U.S. PATENT DOCUMENTS

| 5,267,030 | A | * | 11/1993 | Giorgianni et al. | ........ | 358/527 |
| 5,563,717 | A | * | 10/1996 | Koeng et al. | ............ | 358/406 |
| 5,667,944 | A | | 9/1997 | Reem et al. | | |
| 5,673,331 | A | * | 9/1997 | Lewis et al. | ............. | 382/100 |
| 5,767,983 | A | * | 6/1998 | Terashita | ................. | 358/302 |
| 5,809,366 | A | * | 9/1998 | Yamakawa et al. | ......... | 399/39 |
| 5,956,044 | A | * | 9/1999 | Giorgianni et al. | ........ | 345/590 |
| 5,987,222 | A | * | 11/1999 | Terashita | ................. | 358/1.9 |

FOREIGN PATENT DOCUMENTS

| JP | 9197577 A | 7/1997 |
| JP | 10308874 A | 11/1998 |

* cited by examiner

Primary Examiner—Samir Ahmed
Assistant Examiner—Brian Q Le
(74) Attorney, Agent, or Firm—Birch, Stewart, Kolasch & Birch, LLP (57) ABSTRACT

In the image processing method, first, frame images exposed and developed in frames of a taking light-sensitive material and calibration patterns exposed outside image exposure areas of the taking light-sensitive material at least one of before and after exposure of the frame images and developed are read digitally to obtain digital image data for the frame images and digital calibration pattern data at an image reading mode. Next, image processing condition concerning at least one of color and density for processing the frame images is adjusted based on a relative value to the obtained digital calibration pattern data. Thereafter the digital image data on the frame images is processed under the thus adjusted image processing condition. This method can reproduce the image processing condition concerning at least one of color and density such as the gray balance which is adjusted by the operator and obtain the same image processing result, even if the same scanner is used and the print timing is different, even if the different scanners of the same model which have instrumental error, or even if the different scanners of the different model.

10 Claims, 5 Drawing Sheets

IMAGE PROCESSING METHOD

BACKGROUND OF INVENTION

This invention relates to an image processing method that digitally reads an image exposed and developed on a taking light-sensitive material and which performs image processing on the basis of the acquired digital image.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing schemes to produce output image data for recording purposes; recording light modulated in accordance with the output image data is used to scan and expose a light-sensitive material to record a latent image, which is subsequently developed to produce a (finished) print. The printer operating on this principle has been commercialized as a digital photoprinter.

In the digital photoprinter, images can be processed as digital image data to determine the exposure conditions for printing, so various operations including the correction of washed-out highlights and flat (dull) shadows due to the taking of pictures with backlight or an electronic flash, sharpening, the correction of color failure and density failure, the correction of underexposure and overexposure, and the correction of insufficiency of marginal luminance can be performed in an effective manner to produce prints of the high quality that has been unattainable by the conventional direct exposure.

Having these features, the digital photoprinter is basically composed of the following units: a scanner (image reading apparatus) that reads the image on a film photoelectrically; an image processing apparatus that processes the captured image to produce output image data (exposing conditions) for recording purposes; and a printer (image recording apparatus) that scan exposes a light-sensitive material in accordance with the output image data and which then performs development and other necessary processing to produce a print.

In the scanner, reading light issuing from an illuminant is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as input image data (image data signals) from the film after being optionally subjected to various image processing schemes.

In the image processing apparatus, image processing conditions are set on the basis of the input image data captured with the scanner and image processing as determined by the thus set conditions is performed on the captured input image data and the resulting output image data (exposing conditions) for recording purposes are sent to the printer.

In the printer, if it is of a type that relies upon exposure by scanning with an optical beam, the latter is modulated in accordance with the output image data from the image processing apparatus and a light-sensitive material is subjected to two-dimensional scan exposure (printing) of a light-sensitive material to form a latent image, which is subsequently developed and given other specified treatments to produce a print (photograph) reproducing the image that was recorded on the film.

Thus, the digital photoprinter does more than outputting prints reproducing the images recorded on films; even if the film image is not highly reproducible for the reason that it was taken under inappropriate conditions, the digital photoprinter performs digital image processing to correct scenes taken with backlight, high contrast scenes, underexposed negatives, low sharpness, the insufficiency of the marginal luminance and other undesired phenomena, thereby facilitating the outputting of prints that reproduce beautiful and high-quality images.

When outputting photographic prints, the digital photoprinter processes the image data for each frame as read from the original film. To this end, gray balance, color balance and various other image processing conditions that concern color and/or density are adjusted either automatically or manually by the operator such that they are at all times optimal for the image in each frame. If necessary, to give an even better finish, the operator makes fine adjustment of the image processing conditions including gray balance. To obtain prints of the same color and/or density from the same original film, it is desired to reproduce the gray balance and other image processing conditions that were adjusted by the operator.

For instance, if reprinting is ordered at the same photo shop that produced simultaneous prints, it is necessary that the simultaneous prints and the reprints be finished to have the same color and/or density. This requirement must also be met in the case where reprinting and simultaneous printing are ordered at different photo shops. To meet this need, it is desired that the gray balance condition used in making the simultaneous prints be faithfully reproduced in the reprints. Consider, for example, the case of reading the original film with a convenient film scanner at hand, applying color adjustments to make a proof print, reading the same original film with a different scanner, say, a high-performance scanner, and making a high volume of prints such as postcard prints that have the same color and/or density balance as the proof print. To be successful in this case, the gray balance condition is desirably reproduced.

In order that the image recorded in each frame of a taking film is processed to an appropriate finish having a good gray balance, Unexamined Published Japanese Patent Application (kokai) No. 197577/1997 proposed a method characterized by printing control patches such as gray patches in the nonimage area of the film, developing the film and reading the control patches with a scanner to estimate the characteristic curve ($\gamma$ characteristic) of the film or correcting the upset in the gray balance due to the time-dependent change (deterioration with the passage of time) of the characteristic curve.

According to the specification of commonly assigned Japanese Patent Application No. 118492/1997, calibration patterns such as gray patches and color patches are preliminarily printed in the nonimage area of a taking film and, after development, the calibration patterns are read with a scanner and balance is struck such that they are given an appropriate finish (for example, the image data for all frames in a roll of original film are adjusted such that grays are correctly reproduced) and this enables perfect color adjustment of the image in each frame.

The above-described techniques ensure that when the images in the frames of a roll of taking film are read with a scanner, an appropriate gray balance is struck for each of the captured images to correct any upset in gray balance due to either deterioration with the passage of time or the characteristics of the film. However, various light sources including daylight, a tungsten lamp and a fluorescent lamp are used to take the images in film frames and it is impossible to correct such variations in the illuminant with reference to calibration patterns consisting of gray patches. If all frames are corrected in terms of calibration patterns, the obtained prints are characterized by "lowered" correction.

In this situation, an auto-setup algorithm is commonly employed to estimate the shooting light source from the characteristic quantities for each frame and perform optimal color adjustment. In a desirable mode, the finished image is displayed on a verification monitor and if the operator finds the need to adjust it, he or she performs the necessary correction with color keys and adjusts the image such as to produce optionally finished prints.

However, the techniques described above are incapable of faithful reproduction of gray balance. For example, it is considerably difficult to process reprints to have the same finish as simultaneous prints. Particularly in the case of post cards, the best conditions for trial printing cannot be reproduced in the second (final) printing.

Another problem is that even if the parameters to the gray balance condition as one of the best conditions for the making of simultaneous prints and for trial printing are stored in a memory and accessed when reprints are ordered or during the second (final) printing, no two prints are guaranteed to have the same finish unless the scanner characteristics are identical between the two instances.

Even if the same scanner is used, faithful reproduction of gray balance is impossible if the scanner characteristics change with time. Even if two scanners of the same model are used, the same problem occurs if they have instrumental error in their characteristics. Of course, gray balance cannot be reproduced faithfully if two different scanners are used.

SUMMARY OF INVENTION

The present invention has been accomplished under these circumstances and has as an object providing an image processing method which is capable of faithful reproduction of gray balance in all situations to be encountered, particularly in the three cases mentioned above.

More particularly, the present invention has the object providing the image processing method capable of reproducing image processing condition concerning at least one of color and density such as the gray balance which is adjusted by operator and obtaining the same image processing result, even if the same scanner is used and the print timing is different, even if the different scanners of the same model which have instrumental error, or even if the different scanners of the different model.

The stated object of the invention can be attained by an image processing method, comprising the steps of:

reading digitally frame images exposed and developed in frames of a taking light-sensitive material and calibration patterns exposed outside image exposure areas of the taking light-sensitive material at least one of before and after exposure of the frame images and developed to obtain digital image data for the frame images and digital calibration pattern data at an image reading mode;

adjusting image processing condition concerning at least one of color and density for processing the frame images based on a relative value to the obtained digital calibration pattern data; and thereafter processing the digital image data on the frame images under the thus adjusted image processing condition.

Preferably, the image reading mode comprises a first image reading mode and a second reading mode, and the adjust of the image processing condition based on the relative value to the digital calibration pattern data is performed by the steps of:

storing as the relative value the image processing condition adjusted during the first image reading mode; and modifying the image processing condition using the relative value stored during the first image reading mode and the digital calibration pattern data that is read during the second image reading mode, in such a way that image processing result concerning at least one of the color and the density in the second image reading mode agrees with the image processing result concerning at least one of the color and the density in the first image reading mode.

Preferably, the storage of the relative value during the first image reading mode is performed by the steps of:

setting for the digital image data on each frame image the image processing condition of each frame as determined through color adjustment by either auto-setup or the operator or both; and determining as the relative value a difference between the set image processing condition and the image processing condition based on the digital calibration pattern data as read during the first image reading mode.

Preferably, the modification of the image processing condition during the second image reading mode is performed by modifying the relative value under the image processing condition based on the acquired digital calibration pattern data in the second image reading mode.

Preferably, the first and second image reading modes are carried out at different image reproductions by a same scanner for image reading, Preferably, the first and second image reading modes are carried out with different scanners of a same model for image reading.

Preferably, the first and second image reading modes are carried out with different scanners of different models for image reading.

Preferably, the storage of the relative values during the first image reading mode is performed by either magnetic recording or recording in an IC cartridge.

Preferably, the calibration patterns are gray patches, the image processing condition is gray balance, and the relative value is difference between the gray balance as set through color adjustment by either the auto-setup or an operator or both and the gray balance based on digital data on the gray patches.

DETAILED DESCRIPTION OF THE INVENTION

The image processing method of the invention is now described in detail with reference to the preferred embodiments shown in the accompanying drawings.

Figure 1:
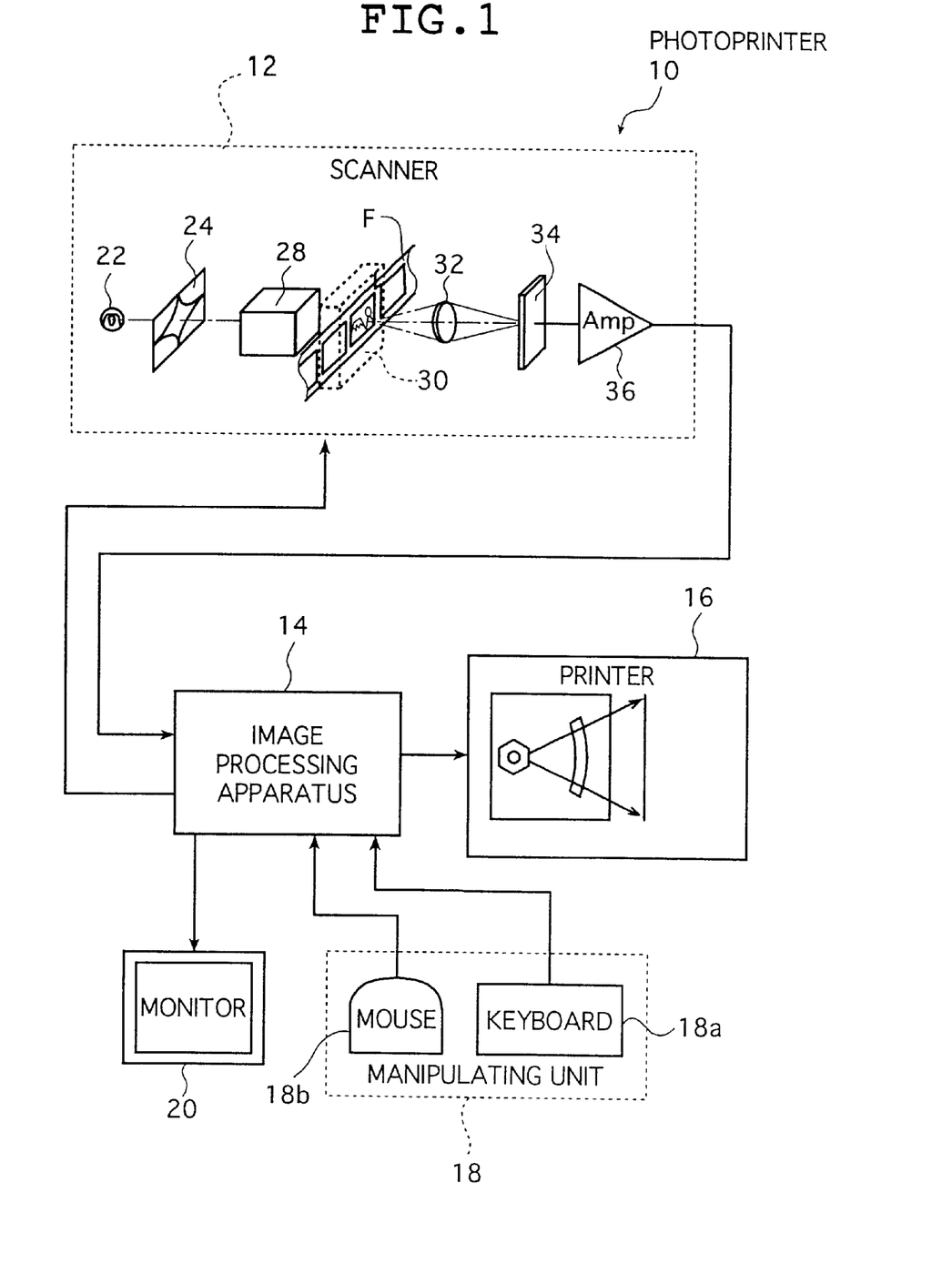
FIG. 1 is a block diagram for an embodiment of the digital photoprinter to which the image processing method of the invention is applicable.

FIG. 1 is a block diagram showing an embodiment of the digital photoprinter implementing the image processing method of the invention. The digital photoprinter indicated by 10 in FIG. 1 (which is hereunder referred to as "photoprinter 10") comprises basically a scanner (image reading apparatus) 12 that reads photoelectrically the image recorded on a film F, an image processing apparatus 14 that performs image processing on the thus read image data (image information) and with which the photoprinter 10 as a whole is manipulated and controlled, and a printer 16 that performs imagewise exposure of a light-sensitive material with light beams modulated in accordance with the image data from the image processing apparatus 14 and which performs development and other necessary treatments to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density corrections, as well as a monitor 20 for representing the image captured with the scanner 12, various manipulative commands and pictures for setting and registering various conditions.

The scanner 12 is an apparatus with which the images recorded on the film F are read photoelectrically. It comprises an illuminant 22, a variable diaphragm 24, a diffuser box 28 which diffuses the reading light incident on the film F so that it becomes uniform across the plane of the film F, an imaging lens unit 32, a CCD sensor 34 for reading the images on the film F, and an amplifier (Amp) 36. The scanner also has a dedicated carrier 30 that is detachably mounted on its body.

As carrier 30, various dedicated types are available that are compatible with elongated films such as 24-exposure films of size 135 and APS (Advanced Photo System) cartridges of size 240. As shown schematically in FIGS. 2A and 2B, the carrier 30 has two transport roller pairs 30a and 30b and a mask 29 having a slit 29a. The transport roller pairs 30a and 30b are provided on opposite sides of a specified reading position in an auxiliary scanning direction which is perpendicular to the main scanning direction (i.e., the direction in which the Line CCD sensors in the CCD sensor 34 extend) and they transport the film F with its length being parallel to the auxiliary scanning direction as it is in registry with the reading position. The slit 29a defines the projected light from the film F to have a specified narrow shape, is in registry with the reading position and extends in the main scanning direction. The carrier 30 also has magnetic READ/WRITE devices 31.

Figure 3:
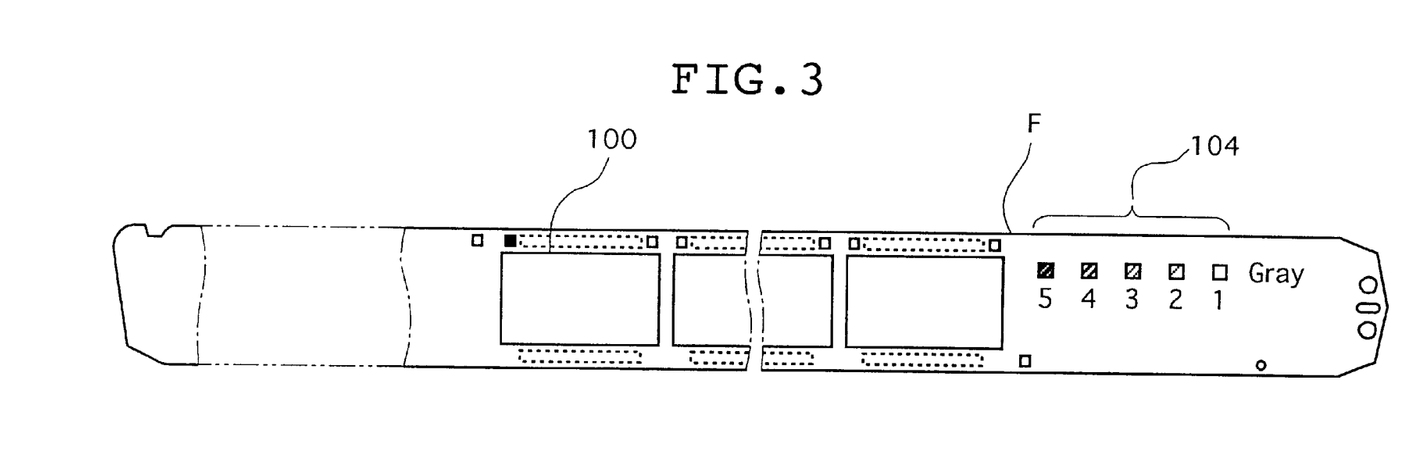
FIG. 3 is a plan view of an embodiment of the film to be set on the scanner shown in FIG. 1.

If the film F in the embodiment under consideration is compatible with APS, it has magnetic recording layers as indicated by 100 in FIG. 3 and they have frame numbers and other magnetic information recorded preliminarily to specify the individual frames in which the images are recorded; additional magnetic information may also be written to these recording layers.

In addition, a pattern 104 providing calibration information is recorded in the rear end portion of the film F. The calibration pattern 104 comprises circular or rectangular images (patch images) of either gray or one of R, G and B colors. In the embodiment under consideration, gray patches representing a gray image in a plurality of gradations is provided as the calibration pattern 104.

The gray patches may be formed as latent image by performing exposure at various times, i.e., prior to film manufacture, during shooting (by exposure with a camera) or just before development. If exposure is to be done just before development, a unit capable of such exposure must be installed in each film developing apparatus (or photoprinter) and this not only increases the equipment cost but also induces variations in the characteristics of the exposing unit. If the gray patches are to be used to attain the object of the invention, they may be exposed during film manufacture without causing any of the problems mentioned above.

The patch images providing the calibration information are formed in the rear end portion of the film F because this area is neutral to the film areas where pictures are recorded and hence is the least likely to become exposed accidentally. Therefore, the patch images may be formed at the front end of the film F or in the base portion around an image frame as long as these areas are neutral to the recording areas of the film and will not become exposed accidentally.

If the film F is the APS film, it is preferable that the magnetic recording layers 100 have recorded therein the positions of the patch images providing the calibration information and the mode in which they were exposed.

Figure 2A:
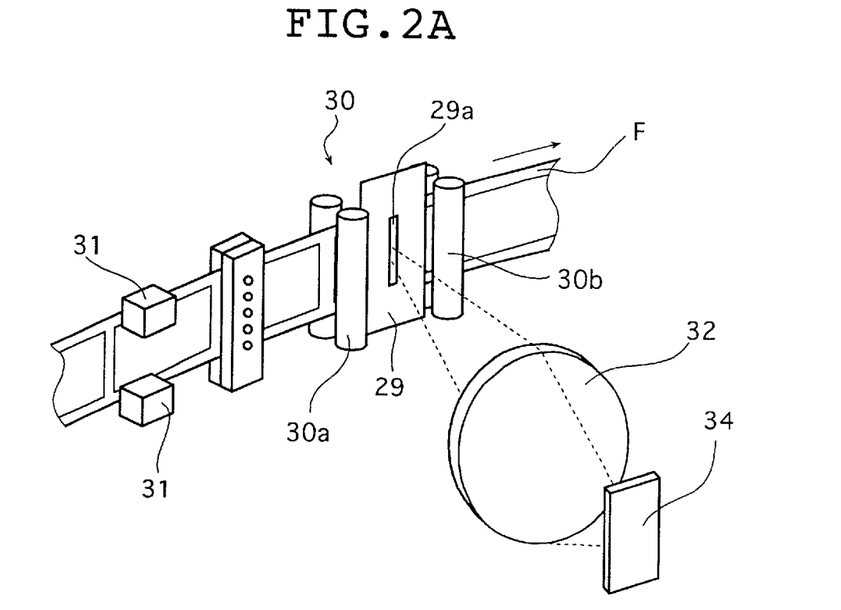
FIG. 2A shows schematically an embodiment of the carrier that is used in the scanner of the digital photoprinter shown in FIG. 1 and on which a film has been loaded.

The film F is set on the carrier 30 adapted to an APS film (or its cartridge) and as it is transported in the auxiliary scanning direction to the specified position by means of the carrier 30 for reading with the CCD sensor 34, the magnetic information is read with the magnetic READ/WRITE devices 31 shown in FIG. 2A so that various kinds of information are sent to the image processing apparatus 14; at the same time, the information from the image processing apparatus 14 can be written to the magnetic recording layers 100 by means of the magnetic READ/WRITE devices 31.

Figure 2B:
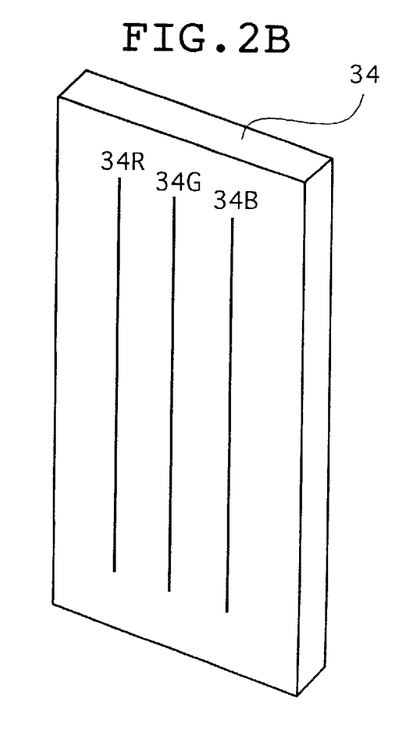
FIG. 2B shows schematically an embodiment of the three CCD line sensors that are used in the scanner shown in FIG. 1.

As shown in FIG. 2B, the CCD sensor 34 is composed of three line sensors, 34R for reading a R image, 34G for reading a G image, and 34B for reading a B image. The projected light from the film F is separated into three primary colors R, G and B and captured photoelectrically by means of the CCD sensor 34.

The reading light from the illuminant 22 has its quantity adjusted by means of the variable diaphragm 24 and rendered uniform by passing through the diffuser box 28. The light is then incident on the film F held in the specified reading position by means of the carrier 30 and thereafter passes through the film F to produce projected light bearing the image recorded on a particular frame of the film.

The projected light from the film F is imaged on the light-receiving plane of the CCD sensor 34 by means of the imaging lens unit 32 and the image is read photoelectrically by means of the CCD sensor 34. The output signals from the CCD sensor 34 are amplified with Amp 36 and sent to the image processing apparatus 14 as input image data.

It should be noted that the scanner 12 to be used in the invention is by no means limited to a type that relies upon the slit scan technique described above but it may be a CCD area sensor that relies upon areal exposure, or a technique by which the image in one frame is scanned across at a time. In this alternative case, R, G and B color filters are provided between the variable diaphragm 24 and the diffuser box 28 (see FIG. 1) and the light passing through these filters to be color adjusted to R, G and B is allowed to be incident on a frame of the film F and transmitted through it to produce projected light bearing the image recorded in that particular frame of the film F. In this case, three reading cycles must be performed by inserting the R, G and B color filters sequentially.

The image reading with the CCD sensor in the scanner 12 comprises prescan and fine scan. Prescan precedes fine scan, or image reading for outputting prints P, and reads the image at low resolution in order to determine the image processing conditions. After the image processing conditions are determined and verified with the monitor, followed by optional adjustments, fine scan is performed by reading the image at high resolution. Thus, two scans are performed with the CCD sensor. If a CCD area sensor equipped with color filters is to be used, a total of six scans is performed.

By prescan, all images in the film F are captured at a time and, after the image processing conditions are set on the basis of the prescanned data, fine scan is performed.

Figure 4:
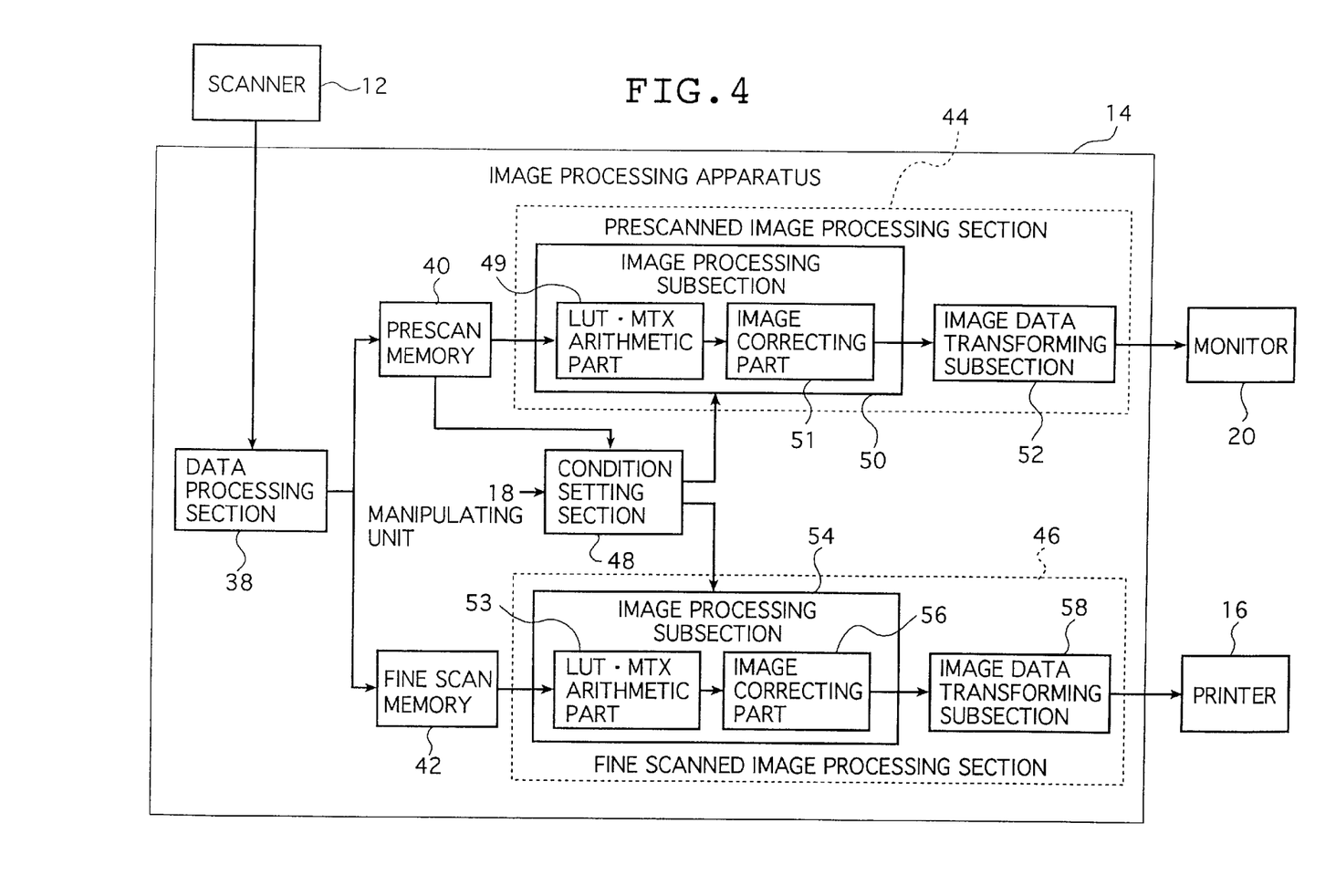
FIG. 4 is a block diagram for an embodiment of the image processing apparatus shown in FIG. 1.

A block diagram for the image processing apparatus 14 is shown in FIG. 4 and it performs specified image processing schemes on the input image data from the scanner 12 and outputs the processed data to the printer 16 or image display device 20. As shown, the image processing apparatus 14 is composed of a data processing section 38, a prescan memory 40, a fine scan memory 42, a prescanned image processing section 44, a fine scanned image processing section 46 and a condition setting section 48.

In the data processing section 38, the R, G and B output signals from the scanner 12 are subjected to various processing schemes including A/D (analog/digital) conversion, log conversion, DC offset correction, dark correction and shading correction, whereupon digital input image data is obtained. Of the digital input image data, prescanned (image) data is stored (loaded) in the prescan memory 40 and fine scanned (image) data is stored in the fine scan memory 42.

In the illustrated embodiments, the data processing section 38 of the image processing apparatus 14 performs the A/D conversion on the output signals from the scanner 12 to obtain the digital input image data. However, the present invention is by no means limited to this embodiment and the A/D conversion may be performed in the scanner 12 to send the digital input image data from the scanner 12 to the image processing apparatus 14.

The prescan memory 40 and the fine scan memory 42 store the digital data obtained by processing in the data processing section 38 and, at the request for image processing and processed data outputting, said digital data is accessed by the prescanned image processing section 44 or the fine scanned image processing section 46.

The prescanned image processing section 44 comprises an image processing subsection 50 and an image data transforming subsection 52. The image processing subsection 50 is composed of a LUT-MTX arithmetic part 49 for performing color balance adjustment, contrast correction, density correction and so forth, and an image correcting part 51 for correcting the distortion and chromatic aberration of magnification due to the aberration characteristics of the lens, as well as sharpening, dodging and so forth. In the image data transforming subsection 52, the image data that has been subjected to image processing in the image processing subsection 50 is transformed with a 3D (three-dimensional)-LUT or the like so that it is processed into a form suitable for display on the monitor 20.

The fine scanned image processing section 46 comprises an image processing subsection 54 and an image transforming subsection 58. The image processing section 54 is composed of a LUT-MTX arithmetic part 53 and an image data correcting part 56.

The LUT.MTX arithmetic part 53 is a site where under the image processing conditions determined on the basis of the prescanned image data, the fine scanned image data is subjected to color balance adjustment, contrast correction (toning) and density correction by processing with LUTs (look-up tables) and to chroma correction by MTX operations. The image correcting part 56 performs the correction of distortion and chromatic aberration of magnification due to the characteristics of the taking lens, as well as electronic scaling (magnification) for enlarging or reducing the image in accordance with the size of prints to be output. The image correcting part 56 also performs sharpening, dodging and any other suitable schemes. In the image data transforming part 58, the image data that has been subjected to image processing in the image processing subsection 54 is transformed with a 3D-LUT or the like so that it is processed into a form suitable for outputting prints from the printer 16.

The condition setting section 48 reads the prescanned image data from the prescan memory 40 and determines the image processing conditions on the basis of that data. First, on the basis of the image data acquired by prescanning all frames of the film original to be processed (e.g. a negative film), the condition setting section 48 performs various operations including the construction of density histograms and the calculation of various image characteristic quantities such as average density, LATD (large-area transmission density), highlights (minimum density) and shadows (maximum density). In addition, in response to an optionally entered operator's command, the condition setting section 48 determines image processing conditions as exemplified by the construction of tables (LUTs) for performing the adjustment of gray balance (see below) and the construction of matrix operational formulae for performing chroma correction.

The image processing subsection 50 performs specified image processing on the basis of the thus determined image processing conditions so that the prescanned image that has been subjected to this image processing is displayed on the monitor 20. Looking at the displayed image, the operator touches the manipulating unit 18 to modify the image processing conditions, whereupon the condition setting section 48 gives an accordingly modified display.

When the operator looking at the monitor screen ends the necessary adjustment for all frames, the setting of the image processing conditions is finalized.

FIG. 4 shows principally those sites in the processing apparatus 14 which relate to image processing. In practice, the processing apparatus 14 has other components such as a CPU that controls and manages the photoprinter 10 taken as a whole including the image processing apparatus 14, a memory for storing the information necessary to operate the photoprinter 10, and means for determining the stop-down value of the variable diaphragm 24 and the charge storage time of the CCD sensor 34 during fine scan.

We now describe the image processing method of the invention with particular reference to the operation in the case where the gray balance adjusted by the operator when making simultaneous prints is reproduced for making reprints. To begin with, we discuss the principles of the method.

The invention is based on the theory that by controlling the gray balance in terms of values relative to the readings of gray patches in the pattern 104 preliminarily printed on the film F (See FIG. 3), the gray balance conditions adjusted by the operator for each frame of the film can be reproduced in all possible cases to be encountered, such as where different scanners of different characteristics are employed, where scanners of the same model having instrumental variability (instrumental error) in characteristics are used, and where color fading occurs in taking light-sensitive materials such as negative and reversal films.

In the embodiment under consideration, the description concerns the case of printing a pattern of gray patches on the film and this suffices for the object of the invention. Needless to say, a pattern of color patches may be printed on the film to enable more precise control over gray balance.

As already mentioned, the gray patches may be exposed, or printed, on the film in either its front or the rear end portion; in the embodiment under consideration, they are printed in the rear end portion of the film. As also mentioned earlier, the gray patches may be exposed either during film manufacture or just before development; in the embodiment under consideration, they are exposed during film manufacture.

Figure 5:
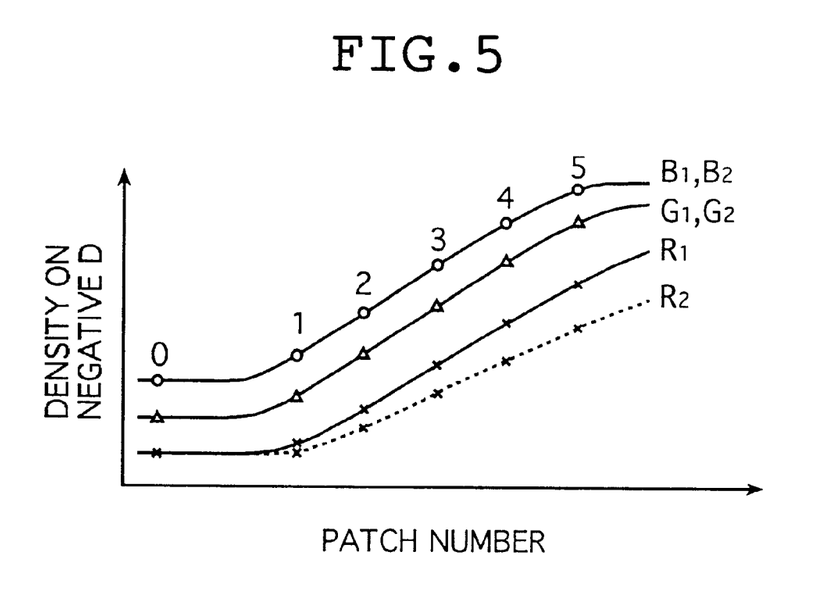
FIG. 5 is a graph showing an example of the readings of gray patches preliminarily recorded in the film shown in FIG. 3.
Figure 6:
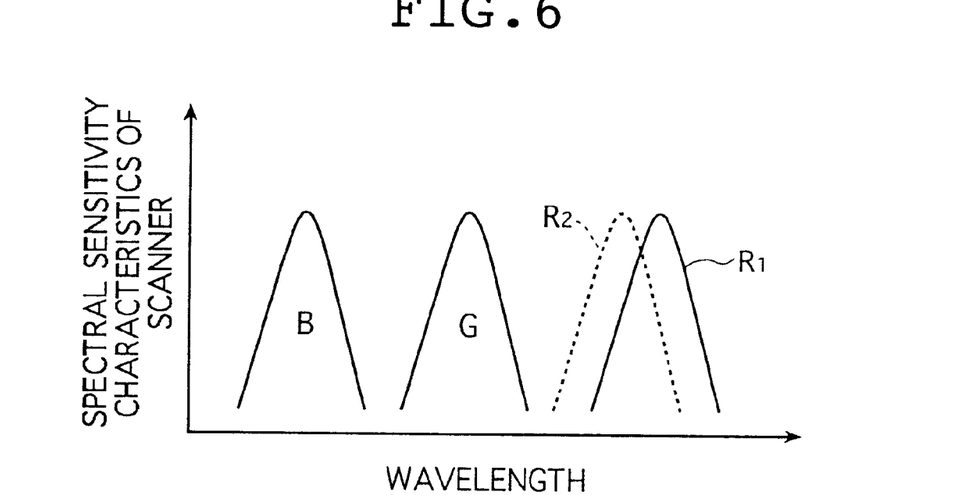
FIG. 6 is a graph illustrating how the readings of gray patches differ with the instrumental error of scanners.

Suppose here that the gray patch pattern 104 printed on the film (see FIG. 3) is read with two scanners SC1 (in the first image reading mode) and SC2 (in the second image reading mode). The readings with scanner SC1 are designated R1, G1 and B1 and indicated in FIG. 5 to lie on a solid line, and the readings with scanner SC2 are designated R2, G2 and B2 and indicated to lie on a dashed line. The gray patch pattern 104 shown in FIG. 3 represents five gradations and comprises patches 1–5. FIG. 5 shows the readings of these gray patches for R (as indicated by X), G (Δ) and B (O), with numerals 1–5 being keyed to the respective patch numbers. Obviously, the readings for G and B agree between the first and second reading modes (i.e., G1=G2, B1=B2) but the readings for R do not (i.e., R1≠R2). Such differences in the readings of gray patches originate from the differences in the linearity and spectral sensitivity characteristics of the scanners.

In other words, if the difference in the spectral characteristics of the two scanners is due to the difference in the separation characteristics for color R whereas they have the same separation characteristics for colors G and B, scanner SC1 reads R1 (as indicated by the solid line) at a wavelength substantially equal to the peak for the cyan dye in the negative whereas the other scanner SC2 reads R2 (as indicated by the dashed line) at a wavelength shorter than the peak. In this case, the R2 characteristics provide an output of lower gamma.

On the basis of the readings of the gray patches as obtained by scanner SC1 (as designated R1, G1 and B1), there are determined LUTs (look-up tables) that enable those gray patches to be finished to gray and let them be expressed by $f_{1R}[\ ]$, $f_{1G}[\ ]$ and $f_{1B}[\ ]$. Similarly, on the basis of the readings of the gray patches as obtained by scanner SC2 (as designated R2, G2 and B2), there are determined LUTs that enable those gray patches to be finished to gray and let them be expressed by $f_{2R}[\ ]$, $f_{2G}[\ ]$ and $f_{2B}[\ ]$.

Suppose that the scanner SC1 performs auto-setup on the image data for a particular frame in the film. Also suppose that the operator performs correction of the frame with DCMY keys. Let the LUTs for the corrected frame be expressed by $g_{1R}[\ ]$, $g_{1G}[\ ]$ and $g_{1B}[\ ]$. Then, the relative values of the gray balance of the corrected frame which are designated ΔR, ΔG and ΔB are expressed by the following equations:

$$\Delta R[x] = g_{1R}[x] - f_{1R}[x] \approx a_R x + b_R \quad \text{(Eq. 1)}$$

$$\Delta G[x] = g_{1G}[x] - f_{1G}[x] \approx a_G x + b_G \quad \text{(Eq. 2)}$$

$$\Delta B[x] = g_{1B}[x] - f_{1B}[x] \approx a_B x + b_B \quad \text{(Eq. 3)}$$

As the right sides of these equations show, the relative values of the gray balance are approximated by linear equations and the coefficients $a_R$, $b_R$, $a_G$, $b_G$, $a_B$ and $b_B$ are stored. Note that the fitting precision can be enhanced if approximation is made by quadratic or cubic equations using an increased number of orders to approximate. In the embodiment under consideration, the coefficient parameters are recorded in the magnetic recording layers 100 of the film F. If the film has no capability of recording the coefficient parameters, they may be recorded in other magnetic recording mediums or in an IC cartridge.

In the embodiment under consideration, ΔR, ΔG and ΔB are approximated by linear equations and the coefficient parameters in those linear equations are stored or recorded. If the storage capacity available is sufficient to store ΔR, ΔG and ΔB, they may be stored as such.

When the scanner SC2 performs image processing of the image data about the particular frame in the film, the aforementioned parameters are retrieved and subjected to the following arithmetic operations to set the LUTs for the particular frame of the film in the scanner SC2 which are designated $g_{2R}[\ ]$, $g_{2G}[\ ]$ and $g_{2B}[\ ]$:

$$g_{2R}[x] = a_R x + b_R + f_{2R}[x] \quad \text{(Eq. 4)}$$

$$g_{2G}[x] = a_G x + b_G + f_{2G}[x] \quad \text{(Eq. 5)}$$

$$g_{2B}[x] = a_B x + b_B + f_{2B}[x] \quad \text{(Eq. 6)}$$

If the scanner SC2 uses the thus set LUTs, it can produce the results that match the color adjustment made by the scanner SC1.

The operation of the present invention is described below more specifically. During the making of simultaneous prints, the prescanned image data and gray patch information (R1, G1 and B1) for all frames of a particular case (one roll of film) that have been prescanned and acquired by the scanner 12 are supplied as input image data into the processing section 38, where they are subjected to various processing schemes including A/D (analog/digital) conversion, log conversion, DC offset correction, dark correction and shading correction; the thus processed image data is stored in the prescan memory 40. The prescanned image data and the gray patch information stored in the prescan memory 40 are accessed by the condition setting section 48; on the basis of the prescanned image data, operations such as the calculation of image characteristic quantities for each frame are performed to set the image processing conditions automatically; in addition, on the basis of the gray patch information (R1, G1 and B1), LUTs (look-up tables) that enable the gray patches to be finished to gray and which are designated $f_{1R}[\ ]$, $f_{1G}[\ ]$ and $f_{1B}[\ ]$ are determined.

Under the thus determined image processing conditions, the prescanned image processing subsection 50 performs color balance adjustment, color density correction, contrast correction and chroma correction, as well as the correction of chromatic aberration of magnification and distortion due to the taking lens, and other necessary operations including sharpening and dodging (compression/expansion of the density's dynamic range); thereafter, the processed image data is sent to the image data transforming subsection 52, where it is transformed with the 3D (three-dimensional)-LUT and so forth so that it is processed into image data suitable for display on the monitor 20; thereafter, a display is shown on the monitor 20.

Looking at the screen of the monitor 20, the operator touches the manipulating unit 18 to enter the necessary modifications for all frames in the film by means of density keys, color keys and so forth so as to change the image processing conditions. In this way, the image processing conditions are finally established for all frames in the film.

When the image processing conditions are finally established by operator input, the aforementioned LUTs for the gray patches have also been changed from the initial $f_{1R}[\ ]$, $f_{1G}[\ ]$ and $f_{1B}[\ ]$ to the corrected $g_{1R}[\ ]$, $g_{1G}[\ ]$ and $g_{1B}[\ ]$. Hence, the relative values of gray balance $\Delta R$, $\Delta G$ and $\Delta B$ are determined for each frame according to Eqs. (1), (2) and (3) set forth above. Those relative values are in turn approximated by linear equations as in the right sides of Eqs. (1), (2) and (3) to determine the coefficients $a_R$, $b_R$, $a_G$, $b_G$, $a_B$ and $b_B$.

After the image processing conditions are finally established, fine scan is performed to read the image at high resolution. During image reading by fine scan, the coefficients $a_R$, $b_R$, $a_G$, $b_G$, $a_B$ and $b_B$ in the linear approximations of the relative values of gray balance $\Delta R$, $\Delta G$ and $\Delta B$ that have been determined in the manner described above for each frame are successively recorded in the magnetic recording layers 100 provided in association with the respective frames of the film F.

The resulting fine scanned image data of high resolution is then sent to the data processing section 38, where it is subjected to various processing schemes including A/D (analog/digital) conversion, log conversion, DC offset correction, dark correction and shading correction; the thus processed image data is stored in the fine scan memory 42.

The stored fine scanned image data is read out of the fine scan memory 42 to be fed into the LUT-MTX arithmetic part 53, where it is adjusted in color balance and corrected for density, contrast and chroma under the determined image processing conditions; the processed, fine scanned image data is in turn sent to the image correcting part 56, where it is corrected for the chromatic aberration of magnification and distortion that originate from the taking lens and the image is scaled electronically in accordance with the size of the prints to be output; in addition, sharpening and dodging (compression/expansion of the density's dynamic range) are performed in response to designation by the operator.

After the various processing schemes in the image processing subsection 54, the image data is sent to the image data transforming subsection 58 where it is subjected to image transformation and processed into output image data that is suitable for outputting to the printer 16. The thus processed image data is then output to the printer 16.

The printer 16 comprises a recording device (exposing device) that records a latent image on a light-sensitive material (photographic paper) by exposing it in accordance with the supplied image data and a processor (developing device) that performs specified processing steps on the exposed light-sensitive material and which outputs it as a print. To give one example of the operation of the recording device, the light-sensitive material is cut to a specified length as determined by the size of the final print and, thereafter, the recording device records a back print. Subsequently, three light beams for exposure to R, G and B that are determined by the spectral sensitivity characteristics of the light-sensitive material are modulated in accordance with the image data output from the image processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The latent image bearing light-sensitive material is then supplied to the processor. Receiving the light-sensitive material, the processor performs a wet development process comprising color development, bleach-fixing and rinsing; the thus processed light-sensitive material is dried to produce a finished print; a plurality of prints thus produced are sorted and stacked in specified units, say, one roll of film.

We next describe how to process the same film to meet an order for reprints which has been placed at a different shop than where the simultaneous prints were made. Assume here that the model of the scanner to be employed in this case has at least instrumental error from the model used in the case of making the simultaneous prints.

As in the making of simultaneous prints, the first step is prescanning with the scanner 12 to read the prescanned image data and gray patch information for all frames of a particular case (one roll of film). Then, the aforementioned coefficients $a_R$, $b_R$, $a_G$, $b_G$, $a_B$ and $b_B$ in the linear approximation of the relative values of gray balance are read from the magnetic recording layers 100 by means of the magnetic READ/WRITE devices 31. The model of the scanner employed in the current case (of making reprints) has instrumental error from the model used in the previous case (of making simultaneous prints), so even if the gray patches themselves are the same, the readings obtained in the current case for the gray patch information differ from those obtained in the previous case and let them be designated R2, G2 and B2.

The input image data, or the prescanned image data and gray patch information (R2, G2, B2) that have been acquired for all frames of the particular case (one roll of film) by prescanning with the scanner 12, is sent to the processing section 38, where it is subjected to various treatments including A/D (analog/digital) conversion, log conversion, DC offset correction, dark correction and shading correction; the processed data is then stored in the prescan memory 40. The prescanned image data and the gray patch information thus stored in the prescan memory 40 are accessed by the condition setting section 48 and, on the basis of the prescanned image data, calculation of the image characteristic quantities and other processing are performed for each frame, whereupon image processing conditions are determined automatically; in addition, on the basis of the gray patch information (R2, G2, B2), there are determined LUTs (look-up tables) that enable the gray patches to be finished to gray and which are designated $f_{2R}[\ ]$, $f_{2G}[\ ]$ and $f_{2B}[\ ]$.

Then, using these LUTs for the gray patches, $f_{2R}[\ ]$, $f_{2G}[\ ]$ and $f_{2B}$, and the coefficients $a_R$, $b_R$, $a_G$, $b_G$, $a_B$ and $b_B$ that have been read out of the magnetic recording layers 100 and which are in the linear approximations of the aforementioned relative values of gray balance $\Delta R$, $\Delta G$ and $\Delta B$, LUTs for the corrected frame, $g_{2R}[\ ]$, $g_{2G}[\ ]$ and $g_{2B}[\ ]$, are set in accordance with the aforementioned Eqs. (4), (5) and (6). These LUTs are obtained if the same color adjustment as has been applied for the previous model by the operator is also applied for the current model. In this way, the previous and current models of scanner can have the same results of color adjustment.

The next step is to represent a display on the monitor 20 and this is how it can be done. Under the thus determined image processing conditions, the prescanned image processing subsection 50 performs color balance adjustment, color density correction, contrast correction and chroma correction, as well as the correction of chromatic aberration of magnification and distortion due to the taking lens, and other necessary operations including sharpening and dodging (compression/expansion of the density's dynamic range); thereafter, the processed image data is sent to the image data transforming subsection 52, where it is transformed with the 3D (three-dimensional)-LUT and so forth so that it is processed into image data suitable for display on the monitor 20; thereafter, a display is shown on the monitor 20.

If no display is to be shown on the monitor 20, the fine scan process described below may immediately follow.

After the image processing conditions are finally established, fine scan is performed to read the image at high resolution. The resulting fine scanned image data of high resolution is then sent to the data processing section 38, where it is subjected to various processing schemes including A/D (analog/digital) conversion, log conversion, DC offset correction, dark correction and shading correction; the thus processed image data is stored in the fine scan memory 42.

The stored fine scanned image data is read out of the fine scan memory 42 to be fed into the LUT-MTX arithmetic part 53, where it is adjusted in color balance and corrected for density, contrast and chroma under the determined image processing conditions; the processed, fine scanned image data is in turn sent to the image correcting part 56, where it is corrected for the chromatic aberration of magnification and distortion that originate from the taking lens and the image is scaled electronically in accordance with the size of the prints to be output; in addition, sharpening and dodging (compression/expansion of the density's dynamic range) are performed in response to designation by the user.

After the various processing schemes in the image processing subsection 54, the image data is sent to the image data transforming subsection 58 where it is subjected to image transformation and processed into output image data that is suitable for outputting to the printer 16. The thus processed image data is then output to the printer 16, where one can obtain prints that have been subjected to the same color adjustment as was performed on the prints obtained with the previous scanner model.

The foregoing description of the embodiment of the invention is directed to the use of an APS compatible film but it should be understood that the image processing method of the invention is also applicable to films of 135 size. In this alternative case, one may provide a storage medium such as a floppy disk or an IC cartridge that is compatible with a film of 135 size and the coefficients $a_R$, $b_R$, $a_G$, $b_G$, $a_B$ and $b_B$ in the linear approximations of the aforementioned relative values of gray balance $\Delta R$, $\Delta G$ and $\Delta B$ are stored in the storage medium in such a way that they are keyed to the information identifying the film and its respective frames.

While the image processing method of the invention has been described above in detail with reference to the various examples, it should be noted that the invention is by no means limited to those examples only and various improvements and modifications may of course be made without departing from the scope and spirit of the invention.

As described above in detail, according to the present invention, a calibration pattern such as gray patches are preliminarily printed in a taking light-sensitive material such as a negative or reversal film and the gray balance and other image processing conditions concerning either color or density or both are controlled in terms of values relative to the calibration pattern data such as the readings of the gray patches. Therefore, even if the scanner used in the current case of making prints has instrumental error from the scanner used in the previous case of making prints or the two scanners are of different models as in the case of making simultaneous prints and reprints or in the case of printing proofs and post cards, or even if color fading occurs in the taking light-sensitive material such as a negative or reversal film, the gray balance conditions that were adjusted by the operator can be faithfully reproduced in all of these cases.

What is claimed is:

1. An image processing method, comprising the steps of:
    digitally reading frame images exposed and developed in frames of a light-sensitive material and calibration patterns exposed outside image exposure areas of the light-sensitive material at least one of before and after exposure of said frame images, and developed to obtain digital image data for said frame images and digital calibration pattern data at an image reading mode, wherein said image reading mode comprises a first image reading mode and a second reading mode;
    adjusting an image processing condition concerning at least one of color and density for processing said frame images based on a relative value to the obtained digital calibration pattern data; and
    processing the digital image data thereafter on said frame images under the thus adjusted image processing condition, wherein the step of adjusting said image processing condition based on the relative value to said digital calibration pattern data is performed by:
    during the first reading mode,
        determining a difference between a set image processing condition for the digital image data and an image processing condition based on the digital calibration pattern data and as said relative value, and
        storing said relative value, and during the second reading mode,
        modifying the image processing condition using said relative value stored during the first image reading mode and digital calibration pattern data that is read during the second image reading mode, in such a way that an image processing result concerning at least one of the color and the density in said second image reading mode agrees with an image processing result concerning at least one of the color and the density in said first image reading mode.

2. The image processing method according to claim 1, wherein the set image processing condition for the digital image data is determined through color adjustment by either auto-setup or an operator or both.

3. The image processing method according to claim 1, wherein said first and second image reading modes are carried out at different image reproductions by a common scanner for image reading.

4. The image processing method according to claim 1, wherein said first and second image reading modes are carried out with different scanners of a same model for image reading.

5. The image processing method according to claim 1, wherein said first and second image reading modes are carried out with different scanners of different models for image reading.

6. The image processing method according to claim 1, wherein the storage of said relative values during said first image reading mode is performed by either magnetic recording or recording in an IC cartridge.

7. The image processing method according to claim 1, wherein adjusting the image processing condition concerning at least one of color and density for processing said frame images based on the relative value to the obtained digital calibration pattern data is achieved with prescanned image data.

8. The image processing method according to claim 1, wherein said processing of the digital image data on said frame images under the thus adjusted image processing condition is achieved after a fine scan of said frame images.

9. The image processing method according to claim 7, wherein said processing of the digital image data on said frame images under the thus adjusted image processing condition is achieved after a fine scan of said frame images.

10. An image processing method, comprising the steps of:

digitally reading frame images exposed and developed in frames of a light-sensitive material and calibration patterns exposed outside image exposure areas of the light-sensitive material at least one of before and after exposure of said frame images, and developed to obtain digital image data for said frame images and digital calibration pattern data at an image reading mode, wherein said image reading mode comprises a first image reading mode and a second reading mode;

adjusting an image processing condition concerning at least one of color and density for processing said frame images based on a relative value to the obtained digital calibration pattern data;

processing the digital image data thereafter on said frame images under the thus adjusted image processing condition, wherein the step of adjusting said image processing condition based on the relative value to said digital calibration pattern data is performed by storing said relative value, wherein the step of storing said relative value during the first image reading mode is performed by setting the image processing condition for the digital image data of each frame image as determined through color adjustment by either auto-setup or the operator or both, and determining a difference between said set image processing condition and the image processing condition based on the digital calibration pattern data as read during said first image reading mode and as said relative value, and modifying the image processing condition using said relative value stored during the first image reading mode and the digital calibration pattern data that is read during the second image reading mode, in such a way that an image processing result concerning at least one of the color and the density in said second image reading mode agrees with an image processing result concerning at least one of the color and the density in said first image reading mode.

* * * * *